United States Patent
Li et al.

(10) Patent No.: US 9,771,869 B2
(45) Date of Patent: Sep. 26, 2017

(54) NOZZLE SYSTEM AND METHOD FOR STARTING AND OPERATING GAS TURBINES ON LOWBTU FUELS

(71) Applicant: General Electric Company, Schenectady, NY (US)

(72) Inventors: Suhui Li, Lathan, NY (US); Joel Meier Haynes, Niskayuna, NY (US); Ping Yu, Shanghai (CN); Wei Chen, Clifton Park, NY (US); David Leach, Simpsonville, SC (US); John Joseph Lipinski, Simpsonville, SC (US); Manuel Moises Cardenas, Jr., Simpsonville, SC (US); Wenjie Wu, Shanghai (CN); Qingguo Zhang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 14/154,692

(22) Filed: Jan. 14, 2014

(65) Prior Publication Data

US 2014/0283524 A1    Sep. 25, 2014

(30) Foreign Application Priority Data

Mar. 25, 2013 (CN) .......................... 2013 1 0097921

(51) Int. Cl.
*F02C 7/264* (2006.01)
*F23R 3/36* (2006.01)
(Continued)

(52) U.S. Cl.
CPC ............... *F02C 7/264* (2013.01); *F02C 3/20* (2013.01); *F02C 3/22* (2013.01); *F02C 9/40* (2013.01); *F23R 3/36* (2013.01)

(58) Field of Classification Search
CPC .... F02C 7/264; F02C 3/20; F02C 3/22; F02C 9/40; F02C 7/232; F23R 3/36; F23D 2209/30
(Continued)

(56) References Cited

U.S. PATENT DOCUMENTS

| 4,716,719 A | * | 1/1988 | Takahashi | ................. F02C 9/26 60/247 |
| 6,345,505 B1 | * | 2/2002 | Green | .................... F23R 3/343 239/406 |

(Continued)

FOREIGN PATENT DOCUMENTS

| CN | 1959213 A | 5/2007 |
| JP | 2005226849 A | 8/2005 |

OTHER PUBLICATIONS

Unofficial English Translation of Chinese Office Action issued in connection with corresponding CN Application No. 201310097921.X on Oct. 9, 2015.
(Continued)

*Primary Examiner* — Christopher Demeree
(74) *Attorney, Agent, or Firm* — Global Patent Operation; Robert D. Crawford, II

(57) ABSTRACT

A fuel nozzle system for enabling a gas turbine to start and operate on low-Btu fuel includes a primary tip having primary fuel orifices and a primary fuel passage in fluid communication with the primary fuel orifices, and a fuel circuit capable of controlling flow rates of a first and second low-Btu fuel gases flowing into the fuel nozzle. The system is capable of operating at an ignition status, in which at least the first low-Btu fuel gas is fed to the primary fuel orifices and ignited to start the gas turbine, and a baseload status, in which at least the second low-Btu fuel gas is fired at baseload. The low-Btu fuel gas ignited at the ignition status has a content of the first low-Btu fuel gas higher than that of
(Continued)

the low-Btu fuel gas fired at the baseload status. Methods for using the system are also provided.

23 Claims, 13 Drawing Sheets

(51) Int. Cl.
*F02C 3/20* (2006.01)
*F02C 3/22* (2006.01)
*F02C 9/40* (2006.01)

(58) Field of Classification Search
USPC ............ 60/776, 786, 39.821, 732, 740, 778, 60/39.463, 742, 747, 790, 39.094
See application file for complete search history.

(56) References Cited

U.S. PATENT DOCUMENTS

| | | | |
|---|---|---|---|
| 6,385,960 B1 | 5/2002 | Kress et al. | |
| 6,666,027 B1 * | 12/2003 | Cardenas, Jr. | ............ F02C 7/08 60/39.465 |
| 8,117,821 B2 | 2/2012 | Mazumder et al. | |
| 8,128,862 B2 | 3/2012 | Harada | |
| 8,151,572 B2 | 4/2012 | Tanaka et al. | |
| 8,176,739 B2 * | 5/2012 | Evulet | ..................... F23R 3/286 60/733 |
| 2008/0016876 A1 * | 1/2008 | Colibaba-Evulet | ....... F02C 9/40 60/776 |
| 2011/0083444 A1 | 4/2011 | Bathina et al. | |
| 2011/0126545 A1 | 6/2011 | Loeven et al. | |
| 2012/0042658 A1 | 2/2012 | Eto et al. | |
| 2012/0137693 A1 | 6/2012 | Tanabe et al. | |

OTHER PUBLICATIONS

"Syngas Turbine Technology", GE Energy, pp. 1-12, 2010.
Jones et al., "Addressing Gas Turbine Fuel Flexibility", GE Energy, pp. 1-20, May 2011.
"GE's Heavy Duty Gas Turbines Surpass 2 Million Fired Hours on Low Carbon-Intensity Fuels", General Electric Company, Mar. 28, 2012.

* cited by examiner

NOZZLE SYSTEM AND METHOD FOR STARTING AND OPERATING GAS TURBINES ON LOWBTU FUELS

BACKGROUND

The present invention relates to a fuel nozzle system for enabling a gas turbine to start and operate on low-Btu fuels and a method for using a fuel nozzle system to start and operate a gas turbine on low-Btu fuels.

In general, gas turbine engines combust a fuel/air mixture that releases heat energy to form a high temperature gas stream. The turbine converts thermal energy from the high temperature gas stream to mechanical energy that rotates a turbine shaft. The turbine may be used in a variety of applications, such as for providing power to a pump or an electrical generator.

Recently, gas turbines usually are equipped with a fuel nozzle, which supplies fuels for ignition and normal running of the gas turbine. A typical fuel used for igniting and running gas turbines is the natural gas. However, due to the scarcity of natural gas source, it has come to rely more and more on other fuels, such as low-Btu gases. For example, there are industrial gas turbines for steel mills fired on blast furnace gas (BFG) with a small amount of coke oven gas (COG) blending. However, the gas turbine still starts on natural gas or liquid fuel, for example, by using a fuel nozzle having a natural gas tip suitable for igniting natural gas and a BFG tip for firing BFG during normal running of the gas turbine. Starting the BFG gas turbine by igniting natural gas not only consumes premium natural gas but also requires separate ignition fuel system such as oil cartridge and oil tank. Moreover, in some circumstances, there may be no natural gas available at sites, such as in steel mills.

Therefore, it is desired to develop a novel gas turbine fuel nozzle capable of starting on low-Btu fuels such as BFG, COG and syngas, as well as a new method for starting gas turbines on low-Btu fuels by using such a novel gas turbine fuel nozzle.

BRIEF DESCRIPTION

The present disclosure relates to a fuel nozzle system for enabling a gas turbine to start and operate on low-Btu fuel. The fuel nozzle system comprises a primary tip comprising primary fuel orifices and a primary fuel passage in fluid communication with the primary fuel orifices, and a fuel circuit capable of controlling flow rates of a first and second low-Btu fuel gases flowing into the fuel nozzle. The system is capable of operating at an ignition status, in which at least the first low-Btu fuel gas is fed to the primary fuel orifices and ignited to start the gas turbine, and a baseload status, in which at least the second low-Btu fuel gas is fired at baseload to operate the gas turbine. The low-Btu fuel gas ignited at the ignition status has a content of the first low-Btu fuel gas higher than that of the low-Btu fuel gas fired at the baseload status.

The present disclosure also relates to a method for starting and operating a gas turbine on low-Btu fuels using a fuel nozzle. The method comprises steps of: providing a first low-Btu fuel source capable of providing a first low-Btu fuel gas; providing a second low-Btu fuel source capable of providing a second low-Btu fuel gas having a heating value lower than that of the first low-Btu fuel gas; providing a fuel nozzle comprising a primary tip comprising a plurality of primary fuel orifices and a primary fuel passage in fluid communication with the primary fuel orifices; providing a fuel circuit for controlling flow rates of the first and second low-Btu fuel gases flowing into the fuel nozzle; operating the fuel nozzle in an ignition status, which comprises igniting the first low-Btu fuel gas or a first combination of the first and second low-Btu fuel gases at the primary fuel orifices to start the gas turbine; and operating the fuel nozzle in a baseload status, which comprises firing the second low-Btu fuel gas or a second combination of the first and second low-Btu fuel gases at baseload to operate the gas turbine. The second combination of the first and second low-Btu fuel gases has a content of the first low-Btu fuel gas lower than that of the first combination.

BRIEF DESCRIPTION OF THE DRAWINGS

The above and other aspects and features of embodiments of the present disclosure will become more apparent in light of the subsequent detailed description when taken in conjunction with the accompanying drawings in which.

DETAILED DESCRIPTION

Figure 1A:
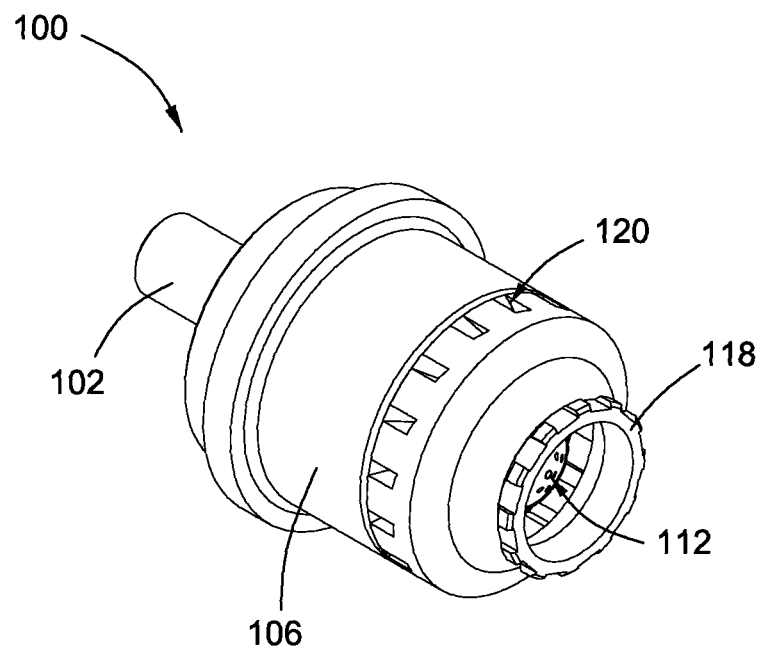
FIG. 1A is a perspective view of a fuel nozzle with dual tip and dual fuel circuit.

Embodiments of the present disclosure will be described with reference to the accompanying drawings. In the subsequent description, well-known functions or constructions are not described in detail to avoid obscuring the disclosure in unnecessary detail.

Approximating language, as used herein throughout the specification and claims, may be applied to modify any quantitative representation that could permissibly vary without resulting in a change in the basic function to which it is related. Accordingly, a value modified by a term or terms, such as "about," is not to be limited to the precise value specified. In certain embodiments, the term "about" means plus or minus ten percent (10%) of a value. For example, "about 100" would refer to any number between 90 and 110. Additionally, when using an expression of "about a first value–a second value," the about is intended to modify both values. In some instances, the approximating language may correspond to the precision of an instrument for measuring the value or values.

Any numerical values recited herein include all values from the lower value to the upper value in increments of one unit provided that there is a separation of at least 2 units between any lower value and any higher value. As an example, if it is stated that the dosage of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless defined otherwise, technical and scientific terms used herein have the same meaning as is commonly understood by one of skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items.

Embodiments of the present disclosure relates to a gas turbine fuel nozzle system using low-Btu fuel gases for both startup and baseload operation. "Low-Btu fuel gas" as used herein, also referred to as low heating value (LHV) gas, which refers to a fuel gas with a low heating value, for example, less than 350 Btu per standard cubic feet (Btu/scf). Examples of the low-Btu fuel gases include, but are not limited to syngas from gasification, blast furnace gas (BFG), coke oven gas (COG), and their combinations, such as BFG with a small amount of COG blending. In certain embodiments, the BFG is a by-product of steel mills and it contains about less than 2 vol % (e.g., around 1 vol %) hydrogen ($H_2$) and about 20-25 vol % carbon monoxide (CO) with a relatively low heating value of about 80-110 Btu/scf. Thus it has a narrow flammability range. Typically, the BFG is blended with 7-10 vol % COG for stable combustion. The COG contains 50-60 vol % $H_2$ and 20-25 vol % methane ($CH_4$), which helps stabilize the flame.

The fuel nozzle system may comprise a fuel nozzle and at least one fuel circuit for controlling fuel gas in the fuel nozzle. The fuel nozzle may comprise one or more tips, each of which comprises a plurality of fuel orifices. The one or more tips may be or may be not separately controlled.

Dual Tip, Dual Fuel Circuit Nozzle

Figure 1B:
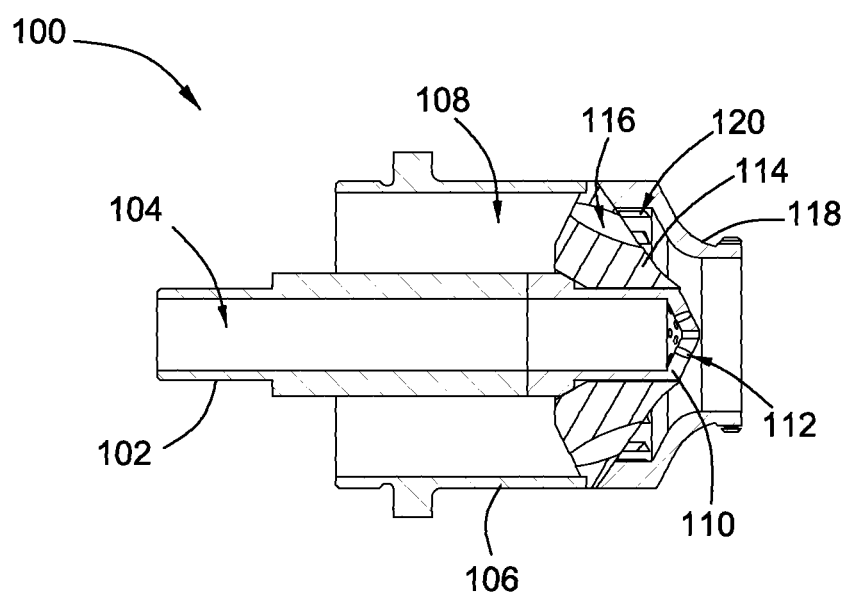
FIG. 1B is a cross sectional view of the fuel nozzle of FIG. 1A, which shows the inside structure of the fuel nozzle.

Referring to FIGS. 1A and 1B, a fuel nozzle system comprises a fuel nozzle 100, which comprises a primary fuel tube 102 defining an interior cavity functioning as a primary fuel passage 104, and a secondary fuel tube 106 surrounding the primary fuel tube 102 and defining an annular inner flow path functioning as a secondary fuel passage 108. The primary fuel tube 102 and the secondary fuel tube 106 substantially are coaxially arranged. The primary fuel tube 102 is ended with a primary tip 110, which has a plurality of primary fuel orifices 112 in fluid communication with the primary fuel passage 104. The secondary fuel tube 106 is ended with a secondary tip 114, which has a plurality of secondary fuel orifices 116 in fluid communication with the secondary fuel passage 108.

In the illustrated embodiment, the primary tip 110 is located at a position downstream of the secondary tip 114 such that the primary fuel orifices 112 in the primary tip 110 are downstream of the secondary fuel orifices 116 in the secondary tip 114. As used herein, the term "downstream" refers to directions and orientations relative to axial flow directions with respect to the longitudinal axis of the fuel nozzle 100. The primary fuel orifices 112 "downstream" of the secondary fuel orifices 116 means that, along the longitudinal axis of the fuel nozzle 100, the primary fuel orifices 112 are located at cross sections downstream of the cross sections that the secondary fuel orifices 116 are located at. It should be noted that this does not means that a fuel needs to flow from the secondary fuel orifices 116 to the primary fuel orifices 112.

The orifice sizes of the primary and/or secondary fuel tip may vary depending on the applications, for example, vary depending on the heating value or Wobbe Index of the fuel gas passing through the orifice. In one exemplary system the primary fuel orifice may be below 0.1 inch in diameter, and the secondary fuel tip orifices may be in the range of 0.2-0.4 inch in diameter.

As used herein, "Wobbe Index" refers to a measure of the amount of heat released by a gas burner with a constant orifice, equal to the gross calorific value of the gas in British thermal units per standard cubic foot (Btu/scf) at standard temperature and pressure divided by the square root of the specific gravity of the gas. If $V_C$ is the higher heating value and $G_S$ is the specific gravity, the Wobbe Index, $I_W$, is defined as $$I_W = \frac{V_C}{\sqrt{G_S}}.$$

It is an indicator of the interchangeability of fuel gases that can be used as a basis for comparison between different gases.

In the illustrated embodiment, the primary fuel orifices 112 are smaller than the secondary fuel orifices 116 in size, such that the pressure drop across primary fuel orifices 112 is sufficiently high to make most of the fuel gases pass through the secondary fuel orifices. Moreover, a small primary fuel orifice creates a relatively high fuel injection velocity, which helps cool the fuel tip at operation. In a specific embodiment, a diameter of the primary fuel orifice 112 is less than ⅓ of that of the secondary fuel orifice 116, depending on the number of the secondary fuel orifices 116.

The fuel nozzle 100 further comprises an air collar 118 adjacent to the primary and secondary tips 110 and 114, which defines a plurality of air passages 120 for allowing air from an external of the fuel nozzle 100 to flow to the primary and secondary fuel orifices 112 and 116 during igniting and firing a fuel gas at the orifices.

The fuel nozzle system further comprises a dual fuel circuit (not show) for separately controlling fuel split between the primary and secondary fuel passages, such that fuel compositions of the two passages can be different. Moreover, in certain embodiments, the dual fuel circuit may enable fine controls of liner temperature and other operating dynamics. In certain embodiments, the dual fuel circuit may comprise two or more manifolds for separately controlling the primary and secondary fuel passages.

The fuel nozzle system is capable of operating at an ignition status in which a low-Btu fuel with a relatively higher heating value is ignited to start a gas turbine and a baseload status in which a low-Btu fuel with a relatively lower heating value is fired at baseload to operate the gas turbine.

In the ignition status, the primary fuel tube 102 is coupled to a first and/or second low-Btu fuel source (not shown), to make the primary fuel passage 104 in fluid communication with the first and/or second low-Btu fuel sources. The first and second low-Btu fuel sources are capable of providing a first low-Btu fuel gas with a higher heating value, for example, COG, and a second low-Btu fuel gas with a lower heating value, for example, BFG, respectively. By using dual fuel circuit for controlling flow rates of the first and/or second low-Btu fuel gases flowing into the primary fuel passage 104, the fuel composition in the primary fuel passage 104 is controllable. Therefore it is controllable to have at least the first low-Btu fuel gas flowing to the primary fuel orifices 112 for ignition. In certain embodiments, the flow rate of the second low-Btu fuel gas is controlled at zero, and only the first low-Btu fuel gas flows to the primary fuel orifices 112 for ignition. In certain embodiments, a combination of the first and second low-Btu fuel gases flows to the primary fuel orifices 112 for ignition. The secondary fuel tube 106 may be also coupled to the first and/or second low-Btu fuel sources to have at least one of the first or second low-Btu fuel gas flowing to the secondary fuel orifices 116 for ignition, or may be coupled to a compressor discharge (CPD) air source (not shown) to have compressed air flowing to the secondary fuel orifices for purging.

In the baseload status, the secondary fuel tube 106 is coupled to the first and/or second low-Btu fuel sources, to make the secondary fuel passage 108 in fluid communication with the first and/or second low-Btu fuel sources. Similarly, by controlling flow rates of the first and/or second low-Btu fuel gases flowing into the secondary fuel passage 108, it is controllable to have at least the second low-Btu fuel gas flowing to the secondary fuel orifices 116 for firing. In certain embodiments, the flow rate of the first low-Btu fuel gas is controlled at zero, and only the second low-Btu fuel gas flows to the secondary fuel orifices 116 for firing. In certain embodiments, a combination of the first and second low-Btu fuel gases flows to the secondary fuel orifices 116 for firing. The primary fuel tube 102 may be also coupled to the first and/or second low-Btu fuel sources to have at least one of the first or second low-Btu fuel gas flowing to the primary fuel orifices 112 for firing, or may be coupled to a CPD air source to have compressed air flowing to the primary fuel orifices 112 for purging.

The combination of the first and second low-Btu fuel gases that flows to the secondary fuel orifices 116 for firing during the baseload status has a content of the first low-Btu fuel gas lower than that of the combination of the first and second low-Btu fuel gases that flows to the primary fuel orifices 112 for ignition during the ignition status, and therefore has a heating value lower than that of the combination that flows to the primary fuel orifices 112 for ignition during the ignition status. The low-Btu fuel gas that flows to the secondary fuel orifices 116 at the ignition status may be either the same as or different from the low-Btu fuel gas that flows to the primary fuel orifices 112 at the same status. The low-Btu fuel gas that flows to the primary fuel orifices 112 at the baseload status may be either the same as or different from the low-Btu fuel gas that flows to the secondary fuel orifices 116 at the same status.

Four exemplary operation embodiments of the fuel nozzle system are described and illustrated with reference to FIGS. 2A-5B.

Figure 2A:
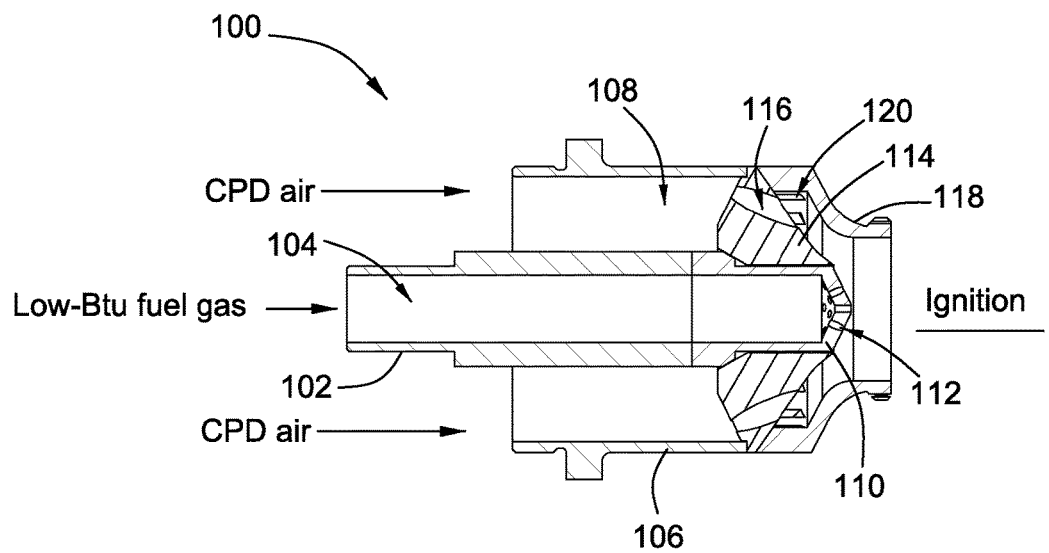
FIGS. 2A and 2B show an ignition status and a baseload status of the fuel nozzle of FIG. 1A, respectively, in accordance with one operation embodiment of the fuel nozzle.
Figure 2B:
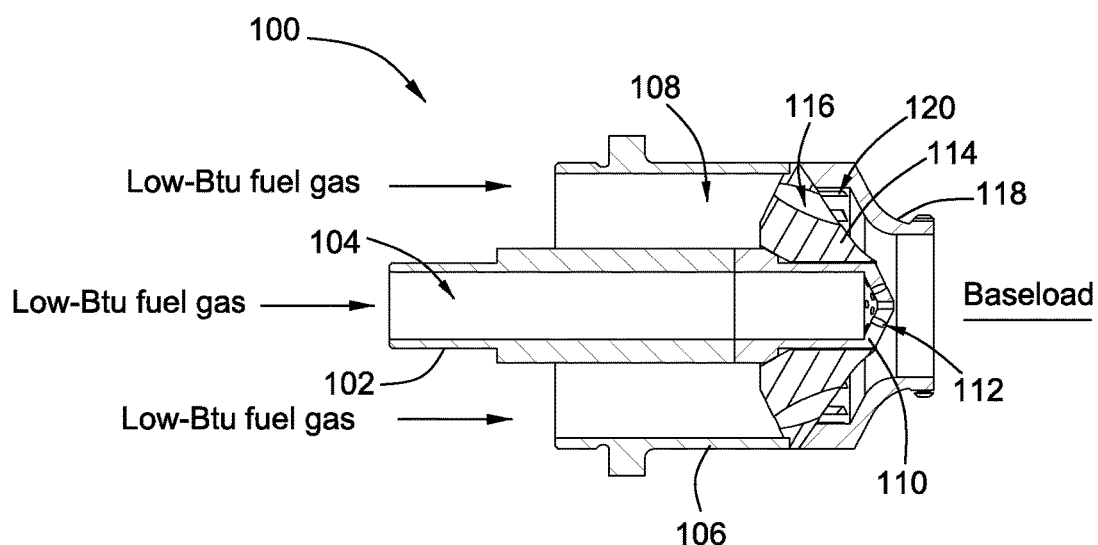

FIGS. 2A and 2B show a first exemplary operation embodiment of the fuel nozzle system. As shown in FIG. 2A, at an ignition status, a low-Btu fuel gas with a relatively higher heating value flows through the primary fuel passage 104 to the primary fuel orifices 112 for ignition, which starts a gas turbine (not shown), while CPD air flows through the secondary fuel passage 108 to the secondary fuel orifices 116 for purging. After ignition, when the gas turbine (GT) reaches a center GT speed/GT load, the fuel nozzle system is transferred to a baseload status. As shown in FIG. 2B, at the baseload status, the secondary fuel passage 108 is fed with a low-Btu fuel with a relatively lower heating value, and the primary fuel passage 104 is fed with the low-Btu fuel gas with the relatively higher or lower heating value, or a low-Btu fuel gas different from both of them. These low-Btu fuel gases respectively flow to the secondary fuel orifices 116 and primary fuel orifices 112 for firing, to provide energy enabling the gas turbine to run at baseload. During the ignition and firing, the low-Btu fuel gas mixes with air injected through the air passages 120 on the air collar 118.

Figure 3A:
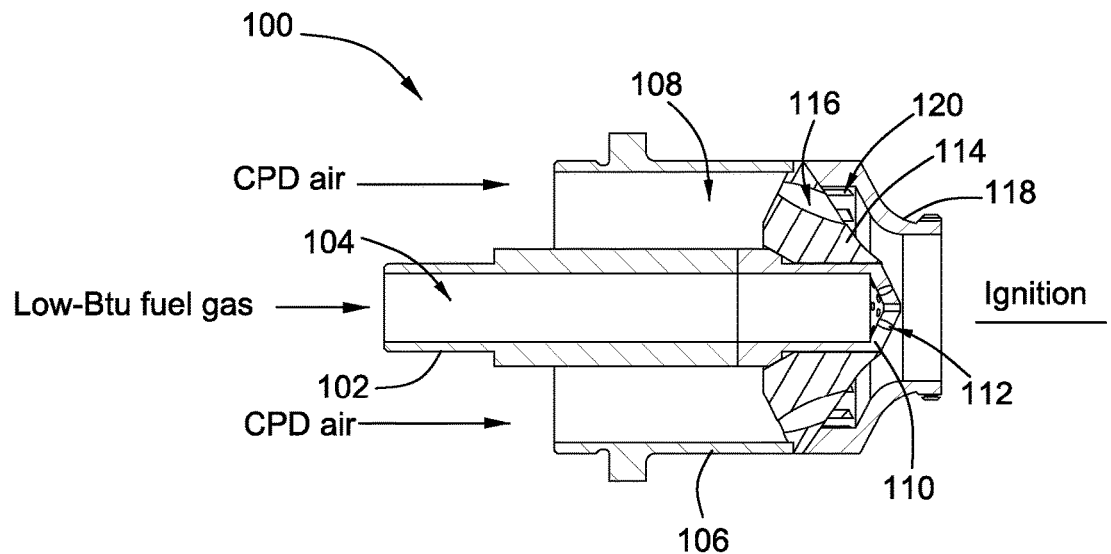
FIGS. 3A and 3B show an ignition status and a baseload status of the fuel nozzle of FIG. 1A, respectively, in accordance with another operation embodiment of the fuel nozzle.
Figure 3B:
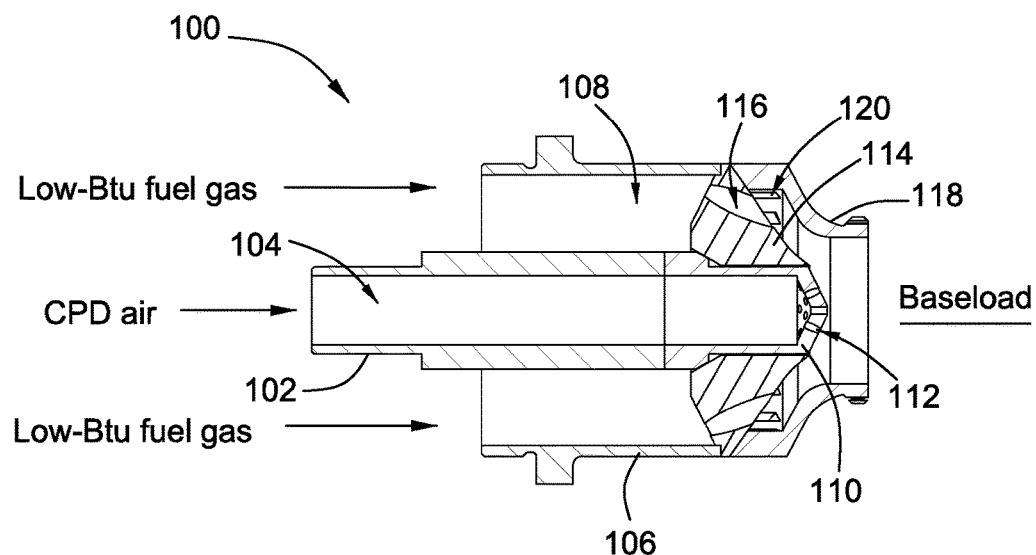

FIGS. 3A and 3B show a second exemplary operation embodiment of the fuel nozzle system. In this embodiment, the ignition status is the same as that of the first embodiment as shown in FIG. 2A. A low-Btu fuel gas with a relatively higher heating value flows through the primary fuel passage 104 to the primary fuel orifices 112 for ignition while CPD air flows through the secondary fuel passage 108 to the secondary fuel orifices 116 for purging. After ignition, when the gas turbine reaches a center GT speed/GT load, the fuel nozzle system is transferred to a baseload status. As shown in FIG. 3B, at the baseload status, the secondary fuel passage 108 is fed with a low-Btu fuel gas with a relatively lower heating value, which flows to the secondary fuel orifices 116 for firing, and the primary fuel passage 104 is fed with CPD air, which flows to the primary fuel orifices 112 for purging.

Figure 4A:
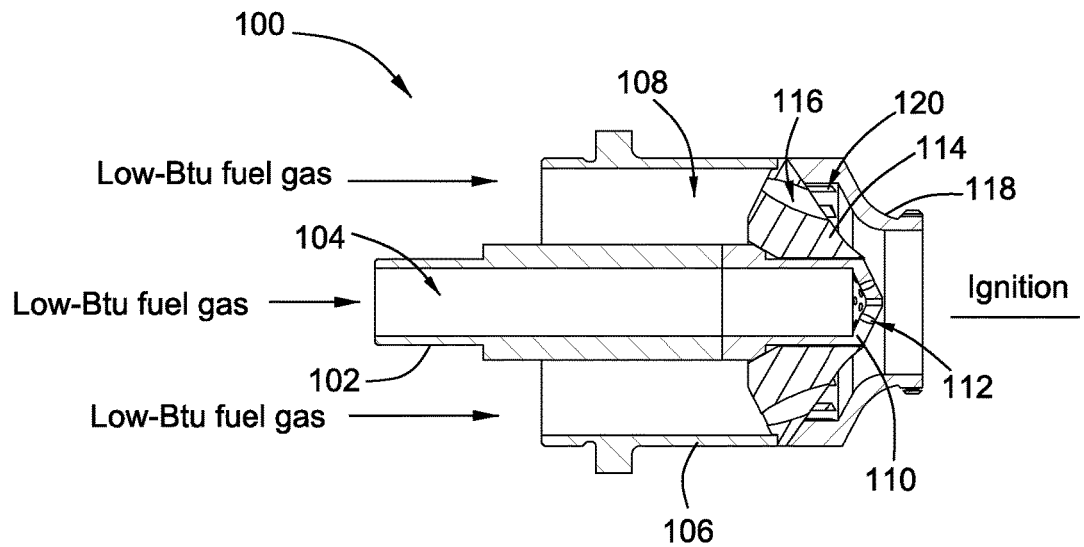
FIGS. 4A and 4B show an ignition status and a baseload status of the fuel nozzle of FIG. 1A, respectively, in accordance with yet another operation embodiment of the fuel nozzle.
Figure 4B:
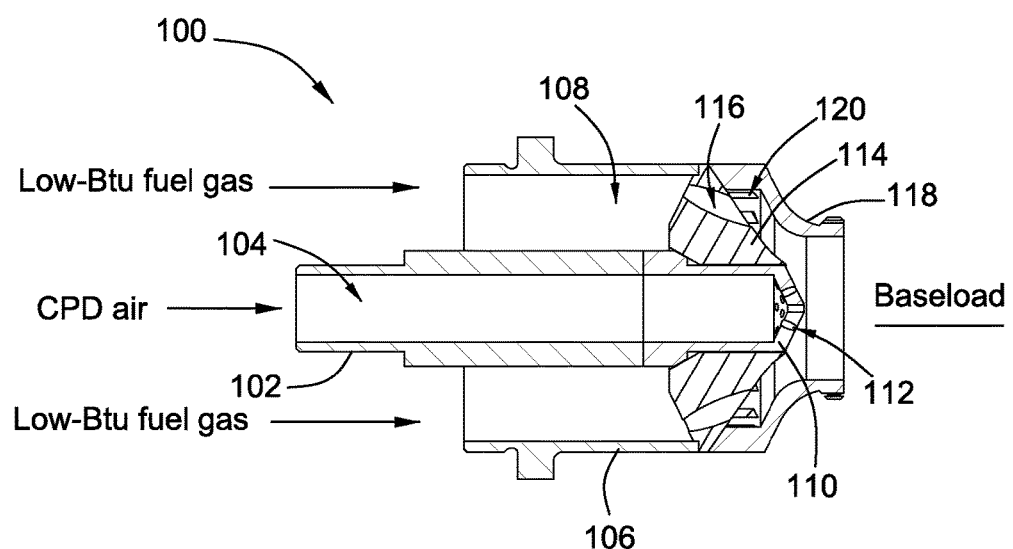

FIGS. 4A and 4B show a third exemplary operation embodiment of the fuel nozzle system. As shown in FIG. 4A, at an ignition status, the primary fuel passage 104 is fed with a low-Btu fuel gas with a relatively higher heating value while the secondary fuel passage 108 is fed with a low-Btu fuel gas either the same as or different from the that low-Btu fuel gas. These first low-Btu fuel gases respectively flow to the primary fuel orifices 112 and secondary fuel orifices 116 for ignition. As shown in FIG. 4B, at a baseload status, the primary fuel passage 104 is fed with CPD air, which flows to the primary fuel orifices 112 for purging, and the secondary fuel passage 108 is fed with a low-Btu fuel gas with a relatively lower heating value, which flows to the secondary fuel orifices 116 for firing.

Figure 5A:
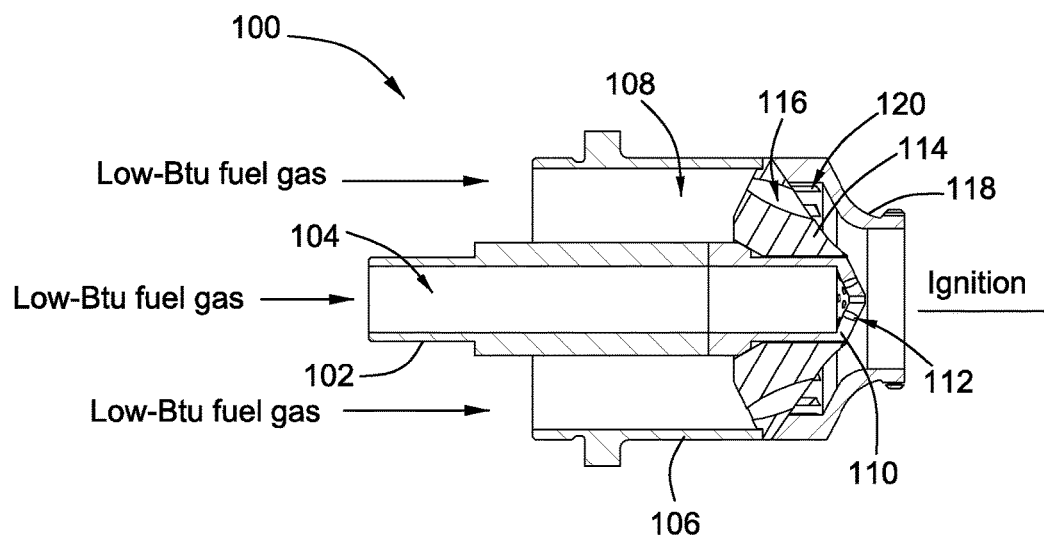
FIGS. 5A and 5B show an ignition status and a baseload status of the fuel nozzle of FIG. 1A, respectively, in accordance with yet another operation embodiment of the fuel nozzle.
Figure 5B:
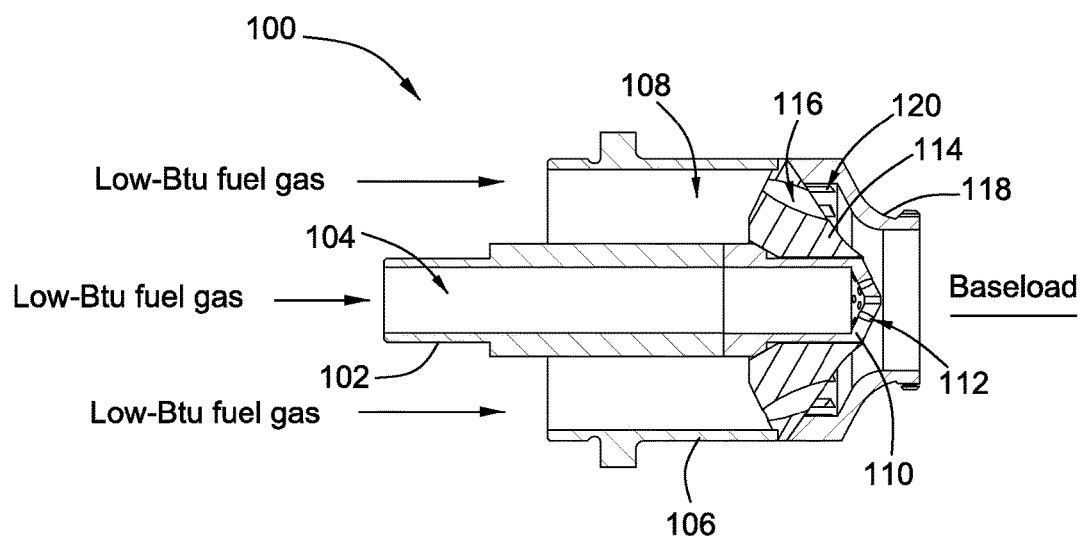

FIGS. 5A and 5B show a fourth exemplary operation embodiment of the fuel nozzle system. In this embodiment, the ignition status is the same as that of the third embodiment as shown in FIG. 4A. At a baseload status, the secondary fuel passage 108 is fed with a low-Btu fuel gas with a relatively lower heating value and the primary fuel passage 104 is fed with a low-Btu fuel gas either the same as or different from that low-Btu fuel gas. These low-Btu fuel gases respectively flow to the secondary fuel orifices 116 and primary fuel orifices 112 for firing.

Figure 6:
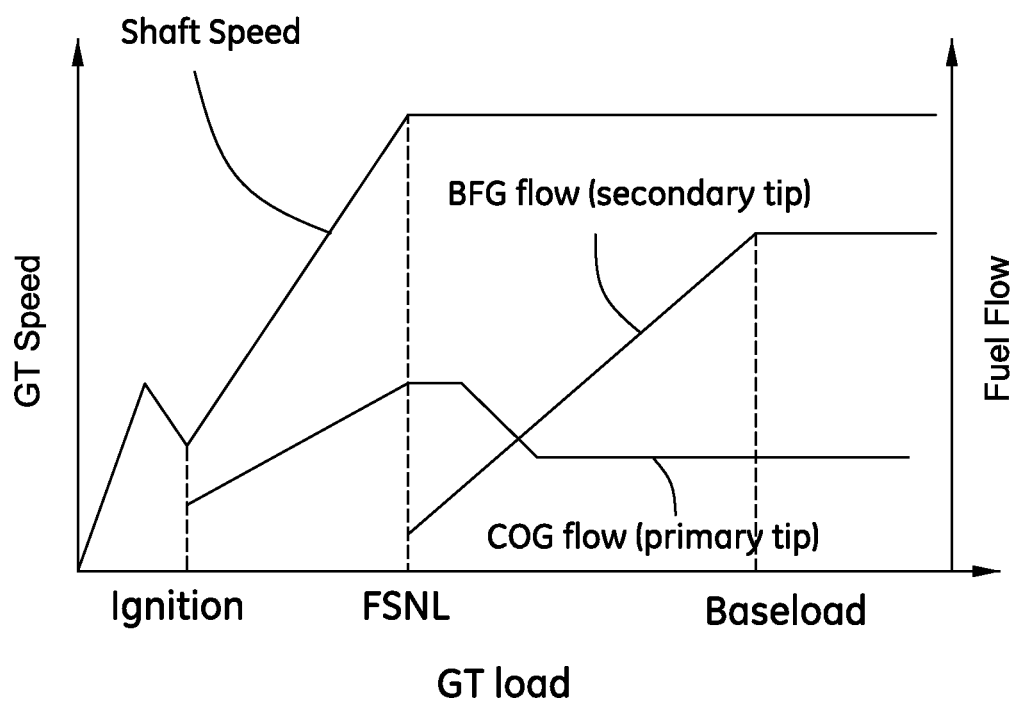
FIG. 6 shows a startup and operation mode using the fuel nozzle of FIG. 1A.

In certain embodiments, both the low-Btu fuel gases with the relatively higher or lower heating value are BFG-COG blends, but at different BFG/COG ratios. The COG content in the low-Btu fuel gas relatively with higher heating value is higher than that in the low-Btu fuel gas with relatively lower heating value. Both of them may come from the same sources of BFG and COG. By individually controlling the flow rates of the BFG and COG, blends with different BFG/COG ratios can be provided. In a specific embodiment, as shown in FIG. 6, COG alone is ignited in the ignition status. When the gas turbine reaches a full speed no load (FSNL) point (or any suitable transfer point), a BFG-COG blend is fired and brings the gas turbine to part load or baseload. The changes of the flow rates of BFG and COG are shown in FIG. 6.

In order to make the above operation embodiments more easy-understanding, a non-limiting example of a specific operation process will be illustrated as follow. When operated in a mode as shown in FIGS. 2A and 2B, the fuel nozzle system may be operated with a process comprising: igniting COG (alone) from the primary tip 110 to start the gas turbine; once the gas turbine reaching the FSNL point, starting firing BFG (alone) from the secondary tip 114 while maintaining the COG flame of the primary tip. The COG flame acts as a pilot flame to stabilize the BFG flame. As the COG flame is very strong and resistant to extinction, the main BFG flame may be stabilized. Such a firing mode, in which COG is fired as a pilot flame at a tip different from the main BFG flame tip, consumes much less COG than firing a BFG-COG blend in a common tip and may have better stabilizing effect.

Therefore, the fuel nozzle system enables the gas turbine to start on COG and operate with less COG blending and offers at least two major advantages. First, the gas turbine can be started on COG alone and such that liquid fuel or natural gas system is eliminated. This saves consumption of liquid fuel at startup, which might be about 10 ton per startup/shutdown cycle. Second, baseload or low-operation can be achieved with BFG with reduced COG consumption. The capability of eliminating liquid fuel or natural gas system and reducing COG consumption may make the fuel nozzle systems particularly suitable for applications in a steel mill or an integrated gasification combined-cycle (IGCC) plant, where natural gas may be unavailable and the available COG may be limited at sites.

Dual Tip, Single Fuel Circuit Nozzle

Figure 7A:
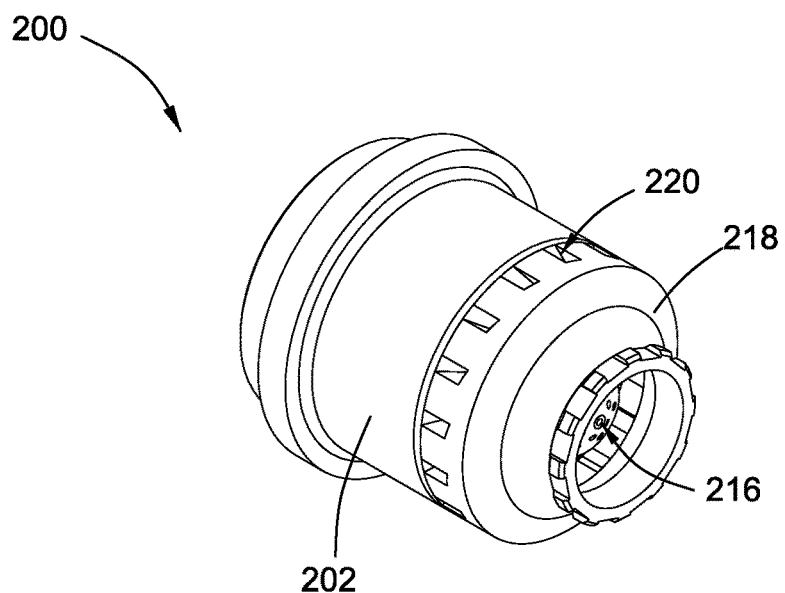
FIG. 7A is a perspective view of a fuel nozzle with dual tip and single fuel circuit.
Figure 7B:
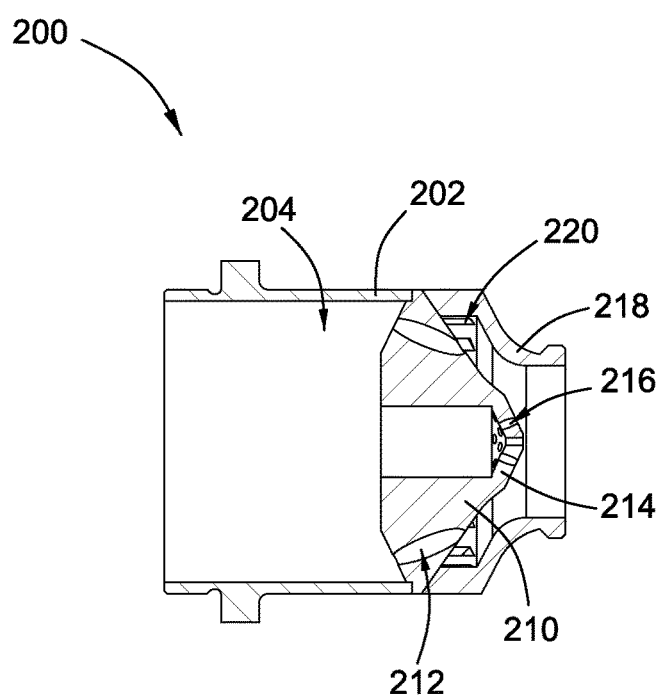
FIG. 7B is a cross sectional view of the fuel nozzle of FIG. 7A, which shows the inside structure of the fuel nozzle.

Referring to FIGS. 7A and 7B, a fuel nozzle system comprises a fuel nozzle 200, which comprises a fuel tube 202 defining an interior cavity functioning as a fuel passage 204. The fuel tube 202 is ended with a primary tip 210 with a plurality of primary fuel orifices 212 and a secondary tip 214 with a plurality of secondary fuel orifices 216, which are larger than the primary fuel orifices 212 in size. The primary and secondary fuel orifices 212 are in fluid communication with the fuel passage 204. In the illustrated embodiment, the primary tip 210 is integrally formed with the secondary tip 214, and located at a position downstream of the secondary tip 214, like that in the nozzle 100 as shown in FIGS. 1A and 1B. The fuel nozzle 200 further comprises an air collar 218 adjacent to the primary and secondary tips 210 and 214, which defines a plurality of air passages 220 for allowing air from an external of the nozzle 200 to flow to the primary and secondary fuel orifices 212 and 216 during igniting and firing a fuel gas at the orifices.

The fuel nozzle system further comprises a single fuel circuit (not show) for controlling both the fuel split to the primary tip 210 and the secondary tip 214, such that compositions of fuel gases ignited or fired at the two tips may be the same. Using a single fuel circuit capable of commonly controlling the fuel split to the primary tip 210 and the secondary tip 214 can not only simplify control but may also save cost in hardware and thus reduce the cost of production.

Figure 8A:
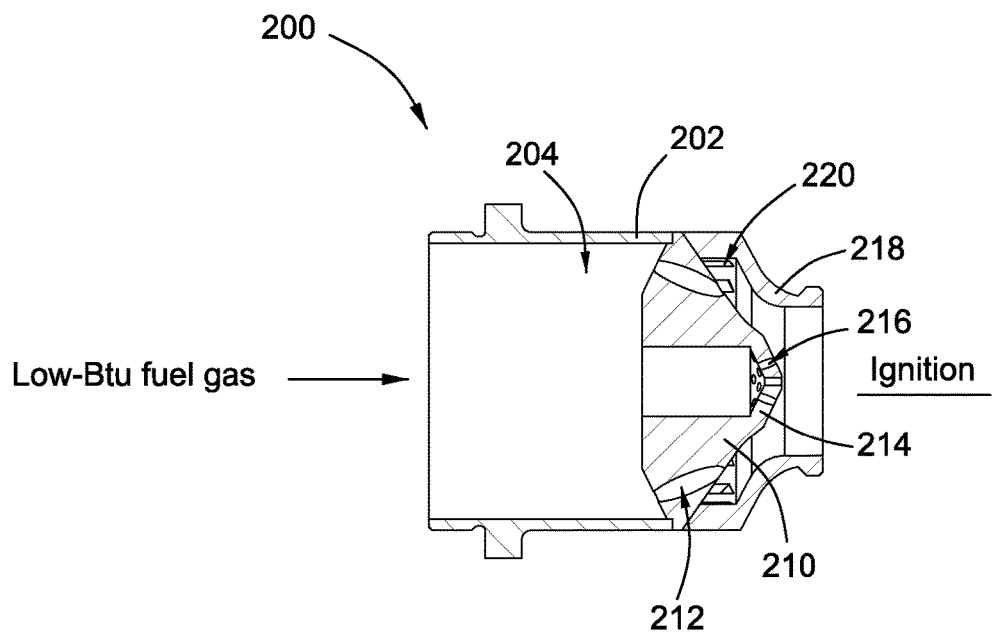
FIGS. 8A and 8B show an ignition status and a baseload status of the fuel nozzle of FIG. 7A, respectively.
Figure 8B:
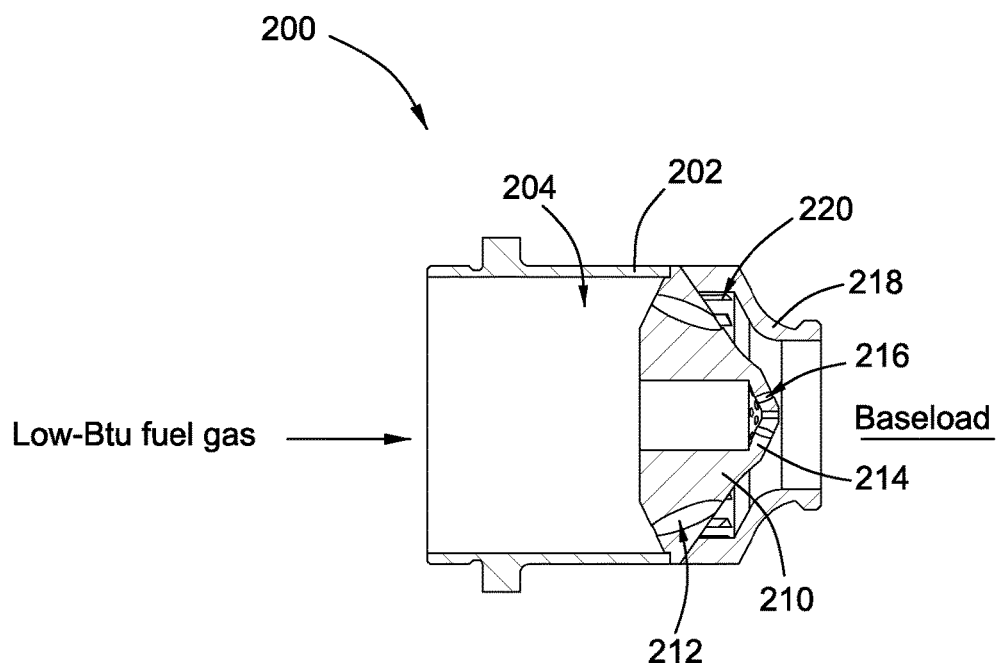

The fuel nozzle system is capable of operating at an ignition status in which a low-Btu fuel with a relatively higher heating value is ignited to start a gas turbine and a baseload status in which a low-Btu fuel with a relatively lower heating value is fired to operate the gas turbine. As shown in FIG. 8A, in the ignition status, the fuel tube 202 is coupled to a first and/or second low-Btu fuel source (not shown), to make the fuel passage 204 in fluid communication with the first and/or second low-Btu fuel sources such that a first and second low-Btu fuel gas, from the first and second sources respectively, which may be blended by different ratios, can flow to the primary fuel orifices 212 for ignition. As shown in FIG. 8B, in the baseload status, the fuel tube 202 may be still coupled to the first and/or second low-Btu fuel sources. By changing the flow rates of the first and/or second low-Btu fuel gases, a low-Btu fuel gas, having a heating value lower than that of the low-Btu fuel gas that flows to the primary fuel orifices 212 for ignition at the ignition status, can be fed to the primary and secondary fuel orifices 212 and 216 for firing. As the primary fuel orifices 212 are smaller than the secondary fuel orifices 216, the low-Btu fuel gas injected from the primary fuel orifices 212 experiences a relatively higher pressure drop and has a relatively high injection velocity, which can also function as a purging stream for preventing fuel tip overheating.

Single Tip, Single Fuel Circuit Nozzle

Figure 9A:
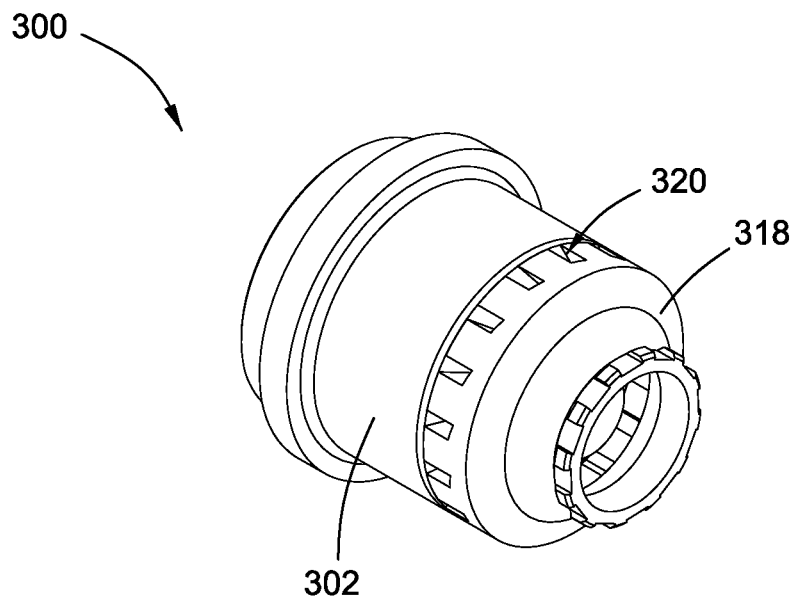
FIG. 9A is a perspective view of a fuel nozzle with single tip and single fuel circuit.
Figure 9B:
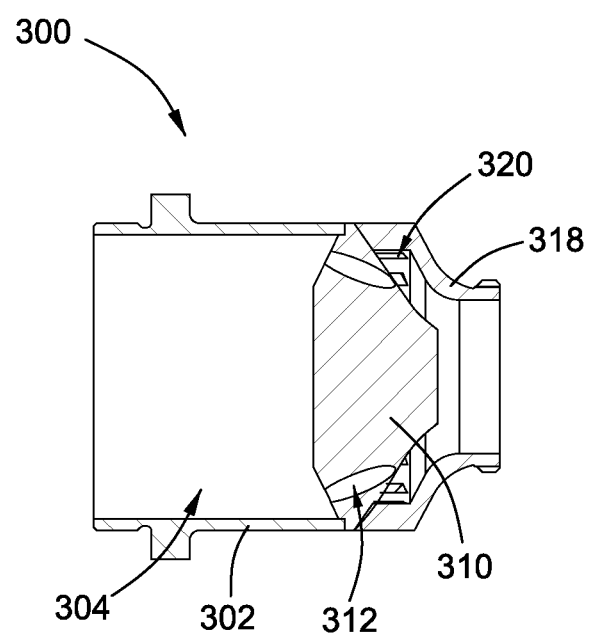
FIG. 9B is a cross sectional view of the fuel nozzle of FIG. 9A, which shows the inside structure of the fuel nozzle.

Referring to FIGS. 9A and 9B, a fuel nozzle system comprises a fuel nozzle 300, which comprises a fuel tube 302 defining an interior cavity functioning as a fuel passage 304. The fuel tube 302 is ended with a tip 310 with a plurality of fuel orifices 312. The fuel orifices 312 are in fluid communication with the fuel passage 304. The fuel nozzle 300 further comprises an air collar 318 adjacent to the tip 310, which defines a plurality of air passages 320 for allowing air from an external of the nozzle 300 to flow to the fuel orifices 312 during igniting and firing a fuel gas at the orifices. The fuel nozzle system further comprises a single fuel circuit (not show) for controlling the fuel composition to the tip 310, such that a composition of the fuel gas ignited at the ignition status may be different that of the fuel gas fired at baseload status.

Figure 10A:
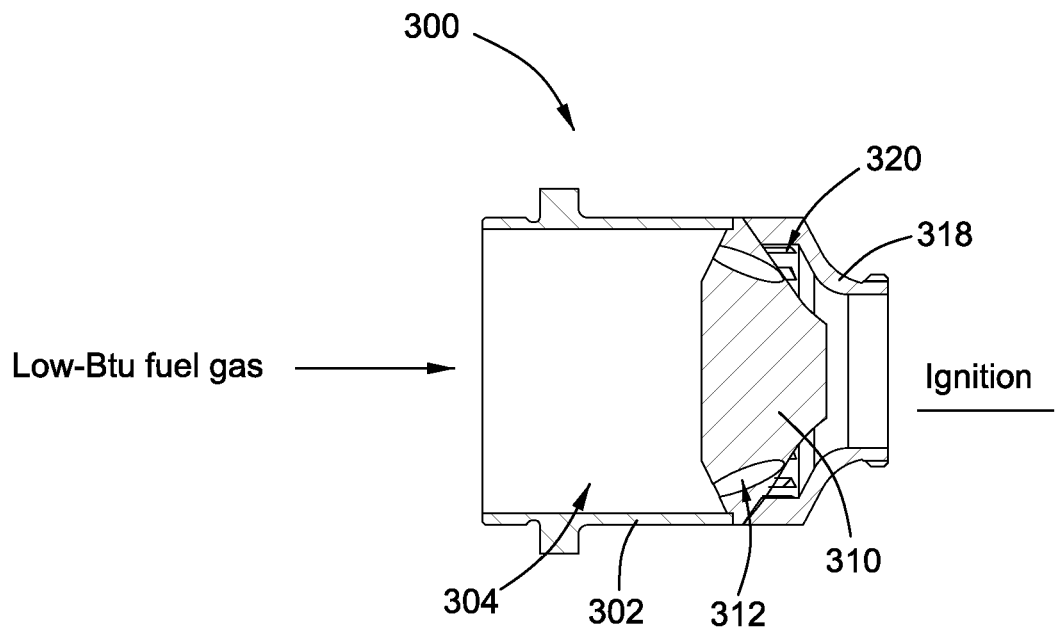
FIGS. 10A and 10B show an ignition status and a baseload status of the fuel nozzle of FIG. 9A, respectively.
Figure 10B:
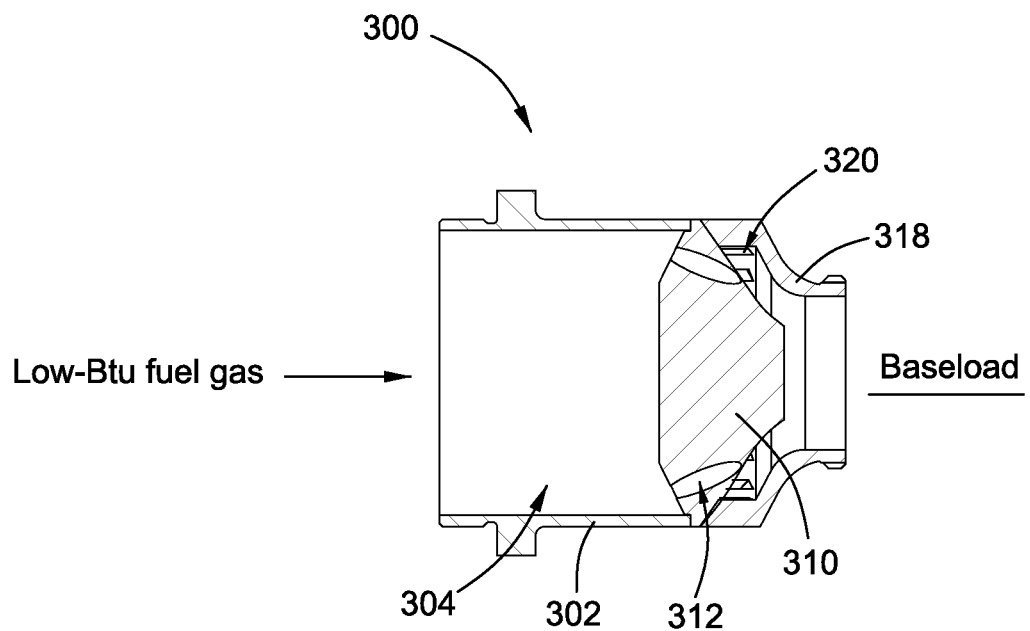

As shown in FIGS. 10A and 10B, in the ignition status, the fuel tube 302 is coupled to a first and/or second low-Btu fuel source (not shown), to make the fuel passage 304 in fluid communication with the first and/or second low-Btu fuel sources such that a first and second low-Btu fuel gas, from the first and second sources respectively, which may be blended by different ratios, can flow to the fuel orifices 312 for ignition. In the baseload status, the fuel tube 302 may be still coupled to the low-Btu fuel source. By changing the flow rates of the first and/or second low-Btu fuel gases, a low-Btu fuel gas, having a heating value lower than that of the low-Btu fuel gas that flows to the primary fuel orifices 312 for ignition at the ignition status, can be fed to the fuel orifices 312 for firing.

The fuel nozzle 300 is simple in design and therefore may save cost in hardware and significantly reduce the cost of production. The size of the fuel orifices 312 is dependent on the heating value or Wobble Index of the fuel gas passing through the fuel orifices for ignition or firing. By scaling the fuel orifices based on the heating value or Wobbe Index of the passing fuel gas, the tip 310 is capable of igniting BFG/COG blends of different ratios at turbine startup conditions, which meets the requirement of minimum pressure ratio (usually around 1.01) across the fuel orifice, without causing autoignition in turbine exhaust duct in failed hot-start or shut-down. For example, a fuel nozzle with 16 secondary fuel orifices of around 0.32 inch in diameter for a fuel gas with a heating value of 123 Btu/scf may generate a pressure ratio of 1.028.

Therefore, the single fuel circuit nozzle systems, such as these as shown in FIG. 7A and FIG. 9A, not only is capable of eliminating liquid fuel or natural gas consumption and reducing COG consumption, but also is simple in design, which may simplify the operation and reduce the production cost of the nozzles themselves.

Figure 11:
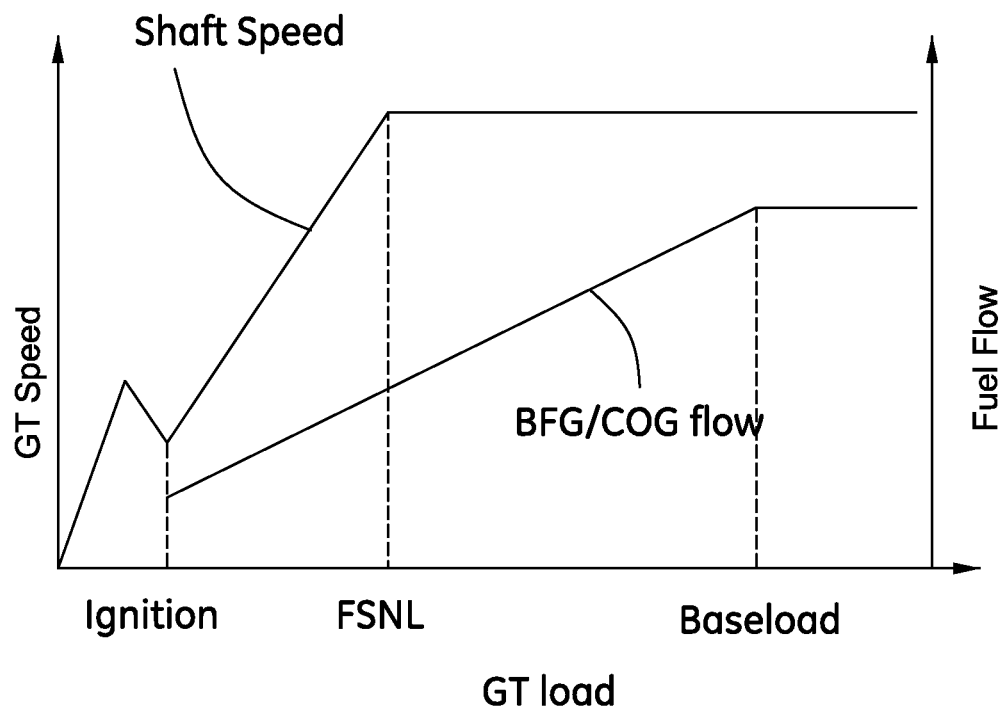
FIG. 11 shows a startup and operation mode using the fuel nozzle of FIG. 7A or the fuel nozzle of FIG. 9A.

Similar to the fuel nozzle system as shown in FIG. 1A, in the single fuel circuit nozzle systems, both the first and second low-Btu fuel gases may be BFG and COG, respectively. A non-limiting example of a startup and operation mode using the single fuel circuit nozzle is shown in FIG. 11.

In certain embodiments, the low-Btu fuel gas for ignition at the ignition status comprises about 5-18 vol %, or preferably about 6-15 vol %, or more preferably 6-11 vol % $H_2$. In certain embodiments, the low-Btu fuel gas for ignition at the ignition status is a BFG-COG blend which comprises 82-90 vol % BFG and 10-18 vol % COG. For example, in a specific embodiment, the low-Btu fuel gas for ignition at the ignition status is a BFG-COG blend which comprises 85 vol % BFG and 15 vol % COG.

In certain embodiments, the low-Btu fuel gas for firing at the baseload status comprises about 5-15 vol %, or preferably about 5-10 vol %, or more preferably 5-8 vol % $H_2$. In certain embodiments, the low-Btu fuel gas for firing at the baseload status is a BFG-COG blend which comprises 88-93 vol % BFG and 7-12 vol % COG. For example, in a specific embodiment, the low-Btu fuel gas for firing at the baseload status is a BFG-COG blend which comprises 93 vol % BFG and 7 vol % COG.

In the above embodiments of the present disclosure, besides the first and second low-Btu fuel sources, there may be additional low-Btu fuel sources which can be couple to the fuel nozzle to provide more low-Btu fuel gases for ignition and/or firing.

In the above embodiments of the present disclosure, the fuel nozzle system may further comprise or coupled to a fuel system for proper fuel metering to the fuel nozzle. The fuel system may comprise fuel control, speed governors, flow divider, pumps, manifold, and vaporizing tubes. Fuel gases may be conducted between these components by flexible or rigid lines. The fuel system is capable of supplying accurately metered fuel gas to the fuel nozzle.

Moreover, in order to prevent flashback in the fuel nozzle, the air and fuel gas flowing for ignition need to be kept at above a certain value, ensuring a relatively high nozzle pressure ratio (usually above 1.01). In order to prevent autoignition in the gas turbine exhaust duct to a heat recovery steam generator during failed hot-restart or shut-down, in certain embodiments, nitrogen or steam or water may be blown into the exhaust.

EXAMPLES

To demonstrate that the fuel nozzle is able to start a gas turbine on low-Btu fuels, ignition experiments were performed to ignite BFG/COG mixtures. COG blending varying from 10-40% (volumetric content), corresponding to 6-24% (volumetric content) $H_2$ content was tested and the ignition performance was evaluated. Natural gas was also used as a baseline comparison. Properties of the BFG and COG used in the experiments are listed in the table as follows.

| Component | BFG | COG | Natural gas |
|---|---|---|---|
| $H_2$ (vol %) | 1.3 | 55.7 | |
| $O_2$ (vol %) | 0.8 | 0.8 | |
| $N_2$ (vol %) | 51.7 | 6.2 | 1.9 |
| CO (vol %) | 22.6 | 7.0 | |
| $CO_2$ (vol %) | 16.8 | 2.6 | |
| $CH_4$ (vol %) | | 20.7 | 93.1 |
| $C_2H_6$ (vol %) | | 1.9 | 5.0 |
| $H_2O$ (vol %) | 6.8 | 5.3 | |
| LHV (Btu/scf) | 80 | 415 | 930 |
| Wobbe index (Btu/scf) | 75 | 638 | 1130 |

Experiments were conducted at typical gas turbine ignition conditions, i.e., air and fuel temperature of 59 F and atmospheric pressure. The air flow was scaled to a single nozzle of the gas turbine, corresponding to 5-18% turbine shaft speed for the primary fuel orifice and 8-27% shaft speed for the secondary fuel orifice, respectively. This air flow range is sufficiently wide to cover typical gas turbine startup speed, which is usually in the range of 10-15% turbine shaft speed. The experiment was conducted with a procedure described as follows.

(a) At the lowest air flow, find the lean ignition limit (LIL), which is the lowest equivalence ratio at which successful ignition can be established. The equivalence ratio is defined as the ratio of actual fuel/air ratio to the stoichiometric fuel/air ratio. The stoichiometric fuel/air ratio is the fuel/air ratio at which the air can just completely oxidize the fuel to form $CO_2$ and $H_2O$, without any extra $O_2$ left.

(b) At increased air flow, find the lean ignition limit as described in step (a) until the maximum air flow corresponding to the highest turbine shaft speed is reached.

(c) Repeat steps (a) and (b) at increased COG blending, until the maximum COG blending is reached.

(d) Repeat step steps (a) and (b) using natural gas.

Then the ignition performance was evaluated in terms of the lean ignition limit, wherein a lower lean ignition limit indicates a larger margin to ignite, i.e., a better ignition performance.

Two experiments were conducted using a fuel nozzle system with only the primary fuel orifice and a fuel nozzle system with only the secondary fuel orifice, respectively. In the first experiment, a single fuel circuit type fuel nozzle system like what is illustrated in FIGS. 7A and 7B, but without secondary fuel orifice 212 on the secondary tip 210 was used. The fuel nozzle has 13 primary fuel orifices of 0.1 inch in diameter. The lean ignition limits of the first experiment are presented in FIG. 12A. In the second experiment, a fuel nozzle system with only the secondary fuel orifice, similar to what is illustrated in FIGS. 9A and 9B, was used. The nozzle has 16 secondary orifices of 0.32 inch in diameter. The lean ignition limits of the second experiment are presented in FIG. 12B.

Figure 12A:
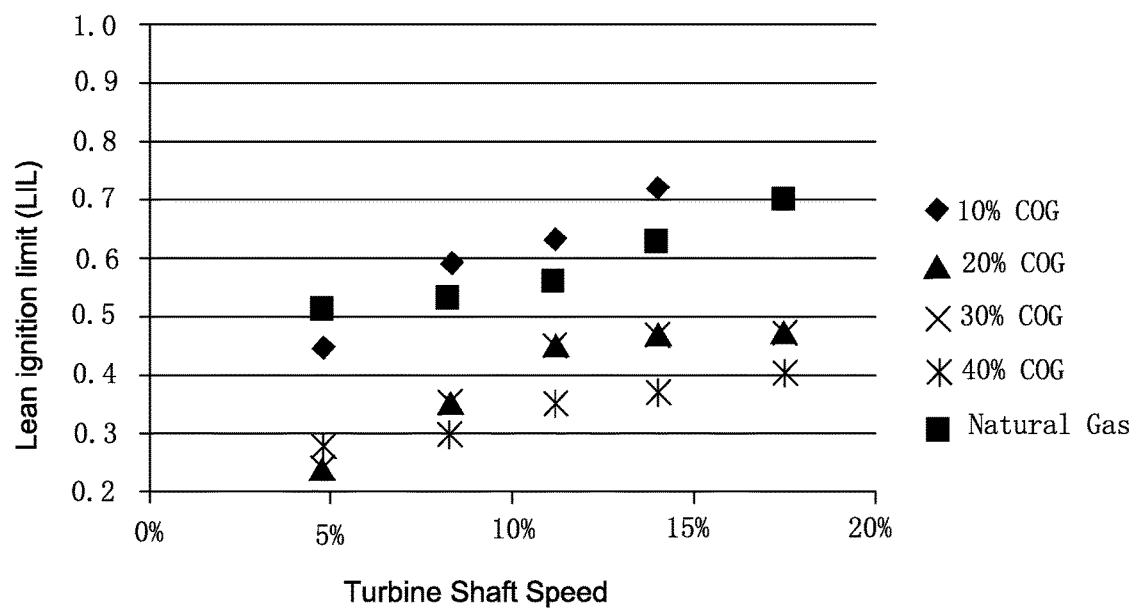
FIGS. 12A and 12B show the lean ignition limit (LIL) of the two experiments described in the example section, respectively.
Figure 12B:
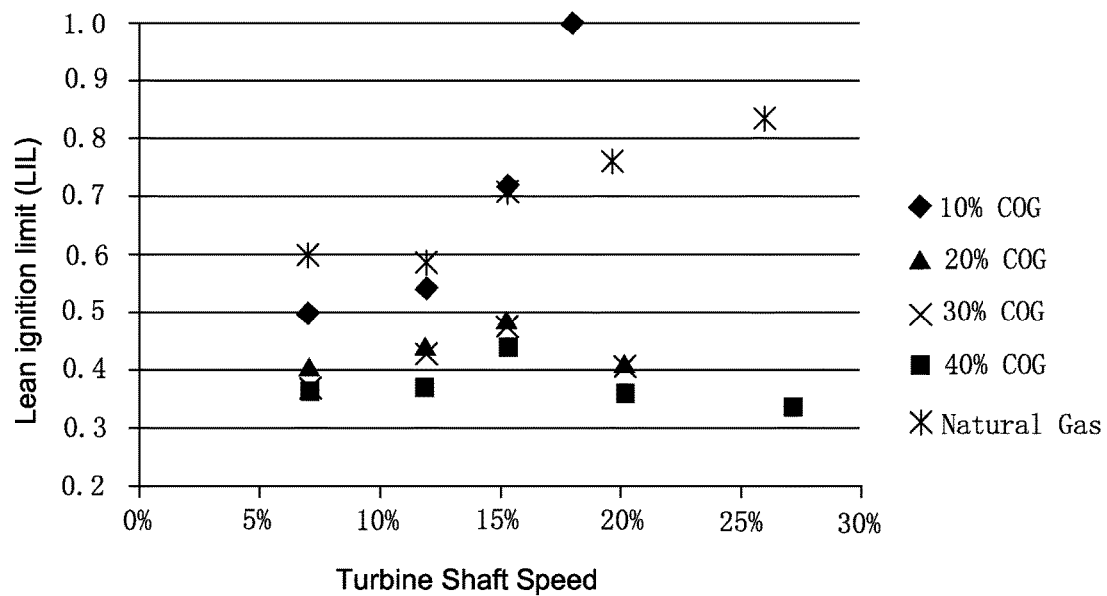

As shown in FIGS. 12A and 12B, for both the two experiments, BFG/COG mixtures have better ignition performance (lower LIL) than natural gas, except for the BFG/COG mixture with 10% COG blending. Therefore, the fuel nozzle with the primary orifice, or the secondary fuel orifice, or the combination of the primary and secondary fuel orifices can be used to start gas turbine with low-Btu fuels such as BFG and COG.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

The invention claimed is:

1. A fuel nozzle system for enabling a gas turbine to start and operate on low-Btu fuel, comprising:
   a fuel nozzle, said fuel nozzle comprising;
      a primary tip comprising a plurality of primary fuel orifices; and
      a primary fuel passage in fluid communication with the primary fuel orifices;
   a fuel circuit capable of controlling flow rates of a first low-Btu fuel gas and a second low-Btu fuel gas flowing into the fuel nozzle; and
   wherein the fuel nozzle system is capable of operating at:
      an ignition status, in which a first fuel composition comprising at least the first low-Btu fuel gas is fed to the primary fuel orifices and ignited to start the gas turbine;
      a baseload status, in which a second fuel composition comprising at least the second low-Btu fuel gas is fired to operate the gas turbine; and
   wherein the fuel circuit is configured to separately control flow rates of the first low-Btu fuel gas and the second low-Btu fuel gas such that the the first fuel composition ignited at the ignition status has a content of the first low-Btu fuel gas higher than that of the second fuel composition fired at the baseload status;
   wherein the first low-Btu fuel gas comprises a first combination of one or more of syngas, blast furnace gas and coke oven gas;
   wherein the second low-Btu fuel gas comprises a second combination of one or more of syngas, blast furnace gas and coke oven gas; and
   wherein the first combination is different than the second combination.

2. The fuel nozzle system of claim 1, wherein
   the fuel nozzle further comprises:
      a secondary tip comprising a plurality of secondary fuel orifices; and
      a secondary fuel passage in fluid communication with the secondary fuel orifices; and
   the fuel circuit is configured to separately control compositions of fuel split between the primary and secondary passages such that at least the second low-Btu fuel gas is fed to the secondary fuel orifices for firing during the baseload status.

3. The fuel nozzle system of claim 2, wherein the fuel nozzle system is configured such that compressed air flows to the secondary fuel orifices for purging during the ignition status, and at least one of the first or second low-Btu fuel gas flows to the primary fuel orifices for firing during the baseload status.

4. The fuel nozzle system of claim 2, wherein the fuel nozzle system is configured such that compressed air flows to the secondary fuel orifices for purging during the ignition status, and compressed air flows to the primary fuel orifices for purging during the baseload status.

5. The fuel nozzle system of claim 2, wherein the fuel nozzle system is configured such that at least one of the first or second low-Btu fuel gas flows to the secondary fuel orifices for ignition during the ignition status, and compressed air flows to the primary fuel orifices for purging during the baseload status.

6. The fuel nozzle system of claim 2, wherein the fuel nozzle system is configured to have at least one of the first or second low-Btu fuel gas flowing to the secondary fuel orifices for ignition during the ignition status, and having at least one of the first or second low-Btu fuel gas flowing to the primary fuel orifices for firing during the baseload status.

7. The fuel nozzle system of claim 2, wherein the primary fuel orifices in the primary tip are located downstream of the secondary fuel orifices in the secondary tip.

8. The fuel nozzle system of claim 2, wherein a diameter of the primary fuel orifice is less than ⅓ of that of the secondary fuel orifice.

9. The fuel nozzle system of claim 1, wherein:
   the fuel nozzle further comprises a secondary tip comprising a plurality of secondary fuel orifices in fluid communication with the primary fuel orifices; and
   the fuel nozzle system is configured such that:
      at least the first low-Btu fuel gas flows to both the primary and secondary fuel orifices for ignition during the ignition status; and
      at least the second low-Btu fuel gas flows to both the primary and secondary fuel orifices for firing and/or purging during the baseload status.

10. The fuel nozzle system of claim 9, wherein the primary fuel orifices in the primary tip are located downstream of the secondary fuel orifices in the secondary tip.

11. The fuel nozzle system of claim 9, wherein a diameter of the primary fuel orifice is less than ⅓ of that of the secondary fuel orifice.

12. The fuel nozzle system of claim 1, wherein the fuel nozzle system is configured to have the at least the second low-Btu fuel gas flowing to the primary fuel orifices for firing during the baseload status.

13. A method for starting and operating a gas turbine on low-Btu fuels using a fuel nozzle comprising:
   providing a first low-Btu fuel source capable of providing a first low-Btu fuel gas;
   providing a second low-Btu fuel source capable of providing a second low-Btu fuel gas having a heating value lower than that of the first low-Btu fuel gas;
   providing a fuel nozzle comprising:
      a primary tip comprising a plurality of primary fuel orifices, and
      a primary fuel passage in fluid communication with the primary fuel orifices;
   providing a fuel circuit for separately controlling flow rates of the first low-Btu fuel gas and the second low-Btu fuel gas flowing into the fuel nozzle;
   operating the fuel nozzle in an ignition status, comprising:
      igniting a first fuel composition comprising at least the first low-Btu fuel gas at the primary fuel orifices to start the gas turbine; and
   operating the fuel nozzle in a baseload status, comprising:
      firing a second fuel composition comprising at least the second low-Btu fuel gas to operate the gas turbine;
   wherein the first fuel composition ignited at the ignition status has a content of the first low-Btu fuel gas higher than that of the second fuel composition fired at the baseload status;
   wherein the first low-Btu fuel gas comprises a first combination of one or more of syngas, blast furnace gas and coke oven gas;

wherein the second low-Btu fuel gas comprises a second combination of one or more of syngas, blast furnace gas and coke oven gas; and wherein the first combination is different than the second combination.

14. The method of claim 13, wherein:

providing the fuel nozzle further comprises providing a secondary tip comprising a plurality of secondary fuel orifices and a secondary fuel passage in fluid communication with the secondary fuel orifices; and operating the fuel nozzle in a baseload status comprises firing the second low-Btu fuel gas or second combination of the first and second low-Btu fuel gases at the secondary fuel orifices.

15. The method of claim 14, wherein:

operating the fuel nozzle in an ignition status further comprises feeding compressed air to the secondary fuel orifices for purging; and operating the fuel nozzle in a baseload status further comprises firing at least one of the first and second low-Btu fuel gases at the primary fuel orifices.

16. The method of claim 14, wherein:

operating the fuel nozzle in an ignition status further comprises feeding compressed air to the secondary fuel orifices for purging; and operating the fuel nozzle in a baseload status further comprises feeding compressed air to the primary fuel orifices for purging.

17. The method of claim 14, wherein:

operating the fuel nozzle in an ignition status further comprises igniting at least one of the first or second low-Btu fuel gas at the secondary fuel orifices; and operating the fuel nozzle in a baseload status further comprises feeding compressed air to the primary fuel orifices for purging.

18. The method of claim 14, wherein:

operating the fuel nozzle in an ignition status further comprises igniting at least one of the first or second low-Btu fuel gas at the secondary fuel orifices; and operating the fuel nozzle in a baseload status further comprises firing at least one of the first or second low-Btu fuel gas at the primary fuel orifices.

19. The method of claim 13, wherein:

providing the fuel nozzle further comprises:
providing a secondary tip comprising a plurality of secondary fuel orifices in fluid communication with the primary fuel passage;

operating the fuel nozzle in an ignition status comprises:
igniting at least the first low-Btu fuel gas at both the primary and secondary fuel orifices; and operating the fuel nozzle in a baseload status comprises:
firing at least the second low-Btu fuel gas at both the primary and secondary fuel orifices.

20. The method of claim 13, wherein operating the fuel nozzle in a baseload status comprises firing at least the second low-Btu fuel gas at the primary fuel orifices.

21. The method of claim 13, wherein the first low-Btu fuel gas is a coke oven gas.

22. The method of claim 13, wherein the second low-Btu fuel gas is a blast furnace gas.

23. The method of claim 13, wherein the first low-Btu fuel gas or first combination of the first and second low-Btu fuel gases ignited at the primary fuel orifices comprises about 5-18% hydrogen by volume.

* * * * *